(12) United States Patent
Chou

(10) Patent No.: US 6,919,881 B2
(45) Date of Patent: Jul. 19, 2005

(54) DIGITAL DISPLAY SYSTEM

(75) Inventor: Hsien-Chung Chou, Taipei (TW)

(73) Assignee: Beauty Up Co., Ltd., Taipei (TW)

( * ) Notice: Subject to any disclaimer, the term of this patent is extended or adjusted under 35 U.S.C. 154(b) by 365 days.

(21) Appl. No.: 10/167,400

(22) Filed: Jun. 13, 2002

(65) Prior Publication Data

US 2003/0080950 A1 May 1, 2003

(30) Foreign Application Priority Data

Oct. 29, 2001 (TW) .................................. 90126802 A

(51) Int. Cl.$^7$ .......................... G09G 5/00; G06K 11/06
(52) U.S. Cl. ................. 345/173; 345/177; 178/18.01
(58) Field of Search ................. 345/173–182; 178/18.01–18.06, 19.01–19.05

(56) References Cited

U.S. PATENT DOCUMENTS 6,417,846 B1 * 7/2002 Lee ........................... 345/173
6,731,270 B2 * 5/2004 Tosaya ....................... 345/173

* cited by examiner

Primary Examiner—Regina Liang
Assistant Examiner—Duc Q Dinh
(74) Attorney, Agent, or Firm—Finnegan, Henderson, Farabow, Garrett & Dunner L.L.P.

(57) ABSTRACT

A digital display system is proposed, which is characterized in provision of a digital board composed of a plurality of currently-available printed circuit boards, wherein each pair of adjacent printed circuit boards are electrically interconnected by a plurality of conductive coupling wires, so as to integrally form a large-scale panel for the digital board. This characteristic feature allows the digital board to be simply fabricated by a currently used jig and flexibly enlarged in dimension according to practical requirements without increasing costs for developing a newly designed jig, thereby making fabrication processes cost-effective to implement. Moreover, the above digital display system can be connected to a computer platform through a wireless communication interface, whereby pixel coordinate signals generated from the digital board can be wirelessly transferred to the computer platform for subsequent manipulation; therefore, this digital display system is relatively more convenient to use than prior art technology.

10 Claims, 4 Drawing Sheets

DIGITAL DISPLAY SYSTEM

FIELD OF THE INVENTION

The present invention relates to digital display systems, and more particularly, to a digital display system providing a large-scale digital board by which data can be touch-controlled and transmitted through wireless communication to a computer platform.

BACKGROUND OF INVENTION

A digital board is customarily referred to as an electronic board, which allows a user to manually write on the board by using a touch pen. The digital board can be further connected to a computer platform by which words or letters written on the board are transformed into graphic files or directly printed out by a printer. This makes the digital board greatly suitable for use in a conference or meeting, and data or information provided on the digital board from a speaker can be promptly recorded down to be later used as reference. Moreover, the digital board can also cooperate with a projector for projecting data displayed on a screen of the computer platform onto the digital board, which allows the user to use the touch pen as a pointing device for operating an application program currently executed by the computer platform. As such, the user can promptly manipulate the computer application program for a speech or product demonstration.

FIG. 1 illustrates basic configuration of a conventional digital display system. As shown in the drawing, this conventional digital display system 100 at least includes: (a) a digital board 110; (b) a touch pen 120; and (c) a computer platform 130. Also, the digital display system 100 can be further selectively connected to a projector 140.

The digital board 110 allows a user to write thereon by using the touch pen 120, which correspondingly urges the digital board 110 to generate pixel coordinate signals that can be transferred to the computer platform 130 through a wired RS-232 communication interface 131. The computer platform 130 then converts the transferred pixel coordinate signals into graphic files, or prompts a printer (not shown) to directly print out words or drawings provided on the digital board 110 by the user.

The touch pen 120 is an inductance type of touch-control device. With provision of the touch pen 120, the user can write on the digital board 110, and accordingly prompts the digital board 110 to generate corresponding pixel coordinate signals.

The computer platform 130 is for example, a desktop personal computer or a notebook computer, which can be connected to the digital board 110 through a communication interface of particular communication protocol, such as standard RS-232 communication interface 131, so as to receive pixel coordinate signals generated from the digital board 110 and convert the received signals into graphic files.

The projector 140 is used to project the display on a screen of the computer platform 130 onto the digital board 110, by which the touch pen 120 can serve as a pointing device for allowing the user to select various window operation functions displayed on the digital board 110 and thereby to manipulate displayed application programs.

However, in practical operation of the above conventional digital display system 100, two significant drawbacks are elicited.

The first drawback is that, connection between the digital board 110 and the computer platform 130 is established through a wired communication interface, which thereby needs to use wires for linking the digital board 110 to the computer platform 130, making practical operation relatively more inconvenient.

The second drawback is that, the digital board 110 is dimensioned regularly with its single piece of panel as 4:3 and 16:9, which respectively provides 1024*768 and 800*600 resolution. Therefore, in necessary, a larger-scale panel of the digital board 110 needs to be specifically made by a particularly designed jig. This would undesirably increase labor and costs of manufacture, whereas each jig can only be suitably applied for fabricating a particularly fixed-sized digital board, making fabrication processes greatly cost-ineffective to implement.

SUMMARY OF THE INVENTION

A primary objective of the present invention is to provide a wireless type of digital display system, by which a digital board can be wirelessly connected to a computer platform.

Another objective of the invention is to provide a novel digital display system having a digital board with a large-scale panel, and the digital board can be fabricated by a currently available jig, thereby making fabrication processes cost-effective to implement without additionally increasing costs for making a newly designed jig.

A further objective of the invention is to provide a novel digital display system, which adopts a digital board with a large-scale panel that can be flexibly enlarged in dimension according to practical requirements, thereby without needing a newly designed jig for manufacturing a specifically dimensioned digital board.

In accordance with the foregoing and other objectives, broadly speaking, the present invention proposes a digital display system, which at least includes: (a) a digital board composed of a plurality of printed circuit boards, wherein each of the printed circuit boards is printed with a grid array of touch-control traces, and a plurality of conductive coupling wires are formed to electrically interconnect terminals of the touch-control traces between adjacent printed circuit boards; (b) a touch pen for allowing a user to use the touch pen to write on the digital board, whereby the digital board is urged to generate corresponding pixel coordinate signals; and (c) a computer platform connected to the digital board through a communication interface of certain communication protocol, so as to receive the pixel coordinate signals generated from the digital board, and to convert the received signals into corresponding graphic files or print out writing provided on the digital board by the user.

The invention is characterized in provision of a digital board composed of a plurality of currently-available printed circuit boards, wherein each pair of adjacent printed circuit boards are electrically interconnected by a plurality of conductive coupling wires, so as to integrally form a large-scale panel for the digital board. This characteristic feature allows the digital board to be simply fabricated by a currently used jig and flexibly enlarged in dimension according to practical requirements without increasing costs for developing a newly designed jig, thereby making fabrication processes cost-effective to implement.

Moreover, the digital display system of the invention can be connected to a computer platform through a wireless communication interface, whereby pixel coordinate signals generated from the digital board can be wirelessly transferred to the computer platform for subsequent manipulation; therefore, this digital display system is relatively more convenient to use than prior art technology.

BRIEF DESCRIPTION OF THE DRAWINGS

The present invention can be more fully understood by reading the following detailed description of the preferred embodiments, with reference made to the accompanying drawings wherein.

DETAILED DESCRIPTION OF THE PREFERRED EMBODIMENT

Figure 1:
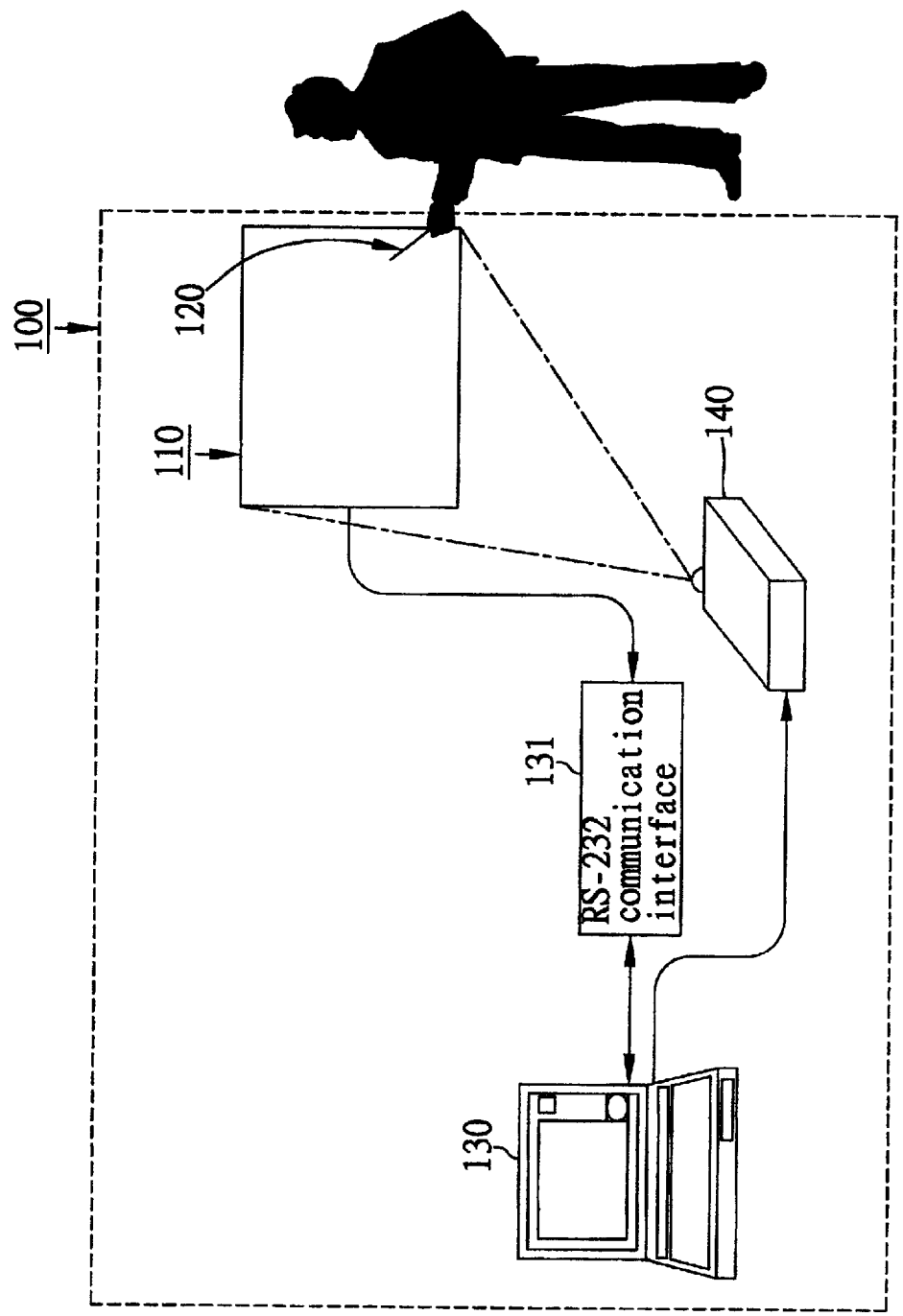
FIG. 1 (PRIOR ART) is a schematic diagram showing basic system configuration of a conventional digital display system.
Figure 2:
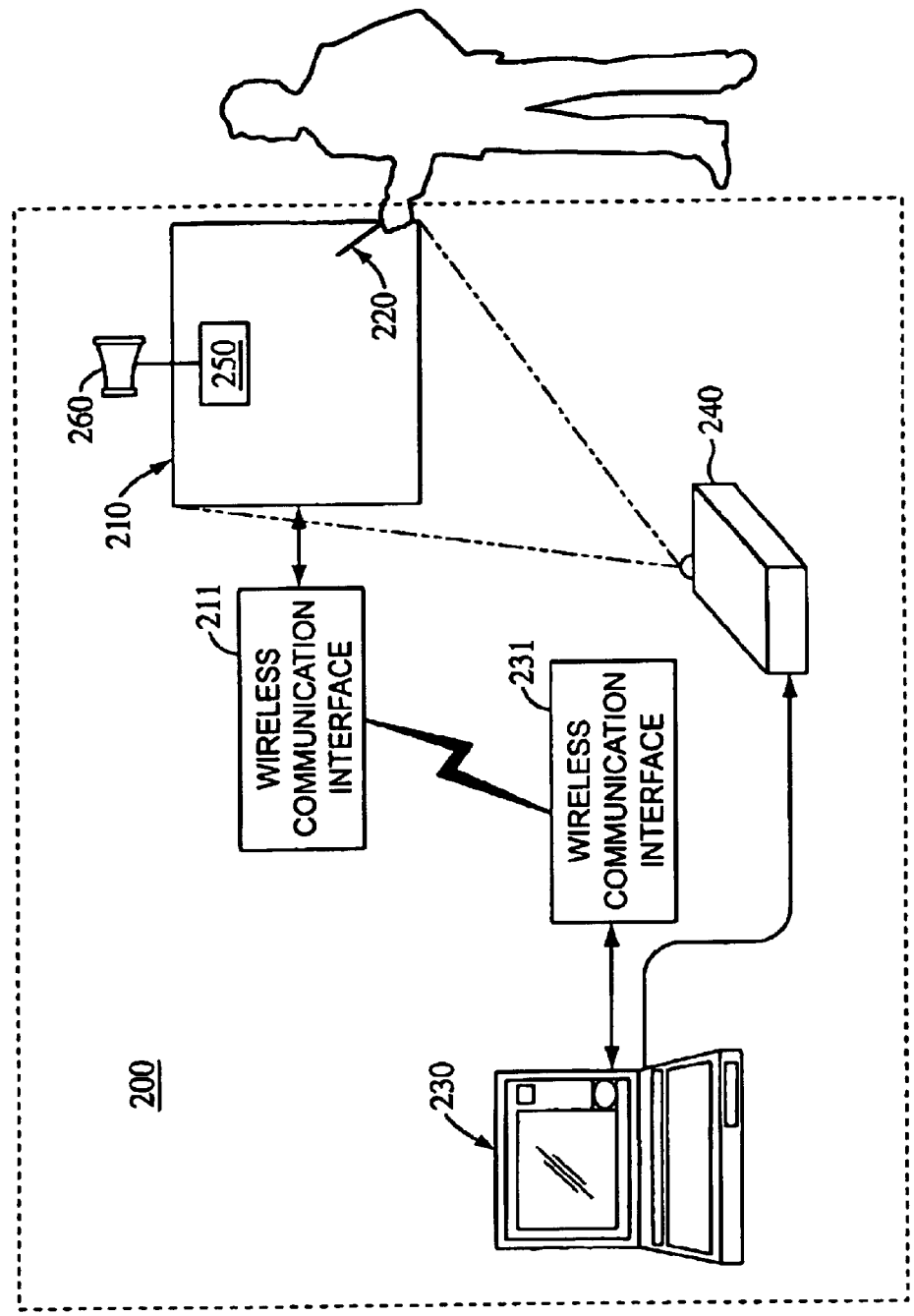
FIG. 2 is a schematic diagram showing basic system configuration of a digital display system of the invention.
Figure 3:
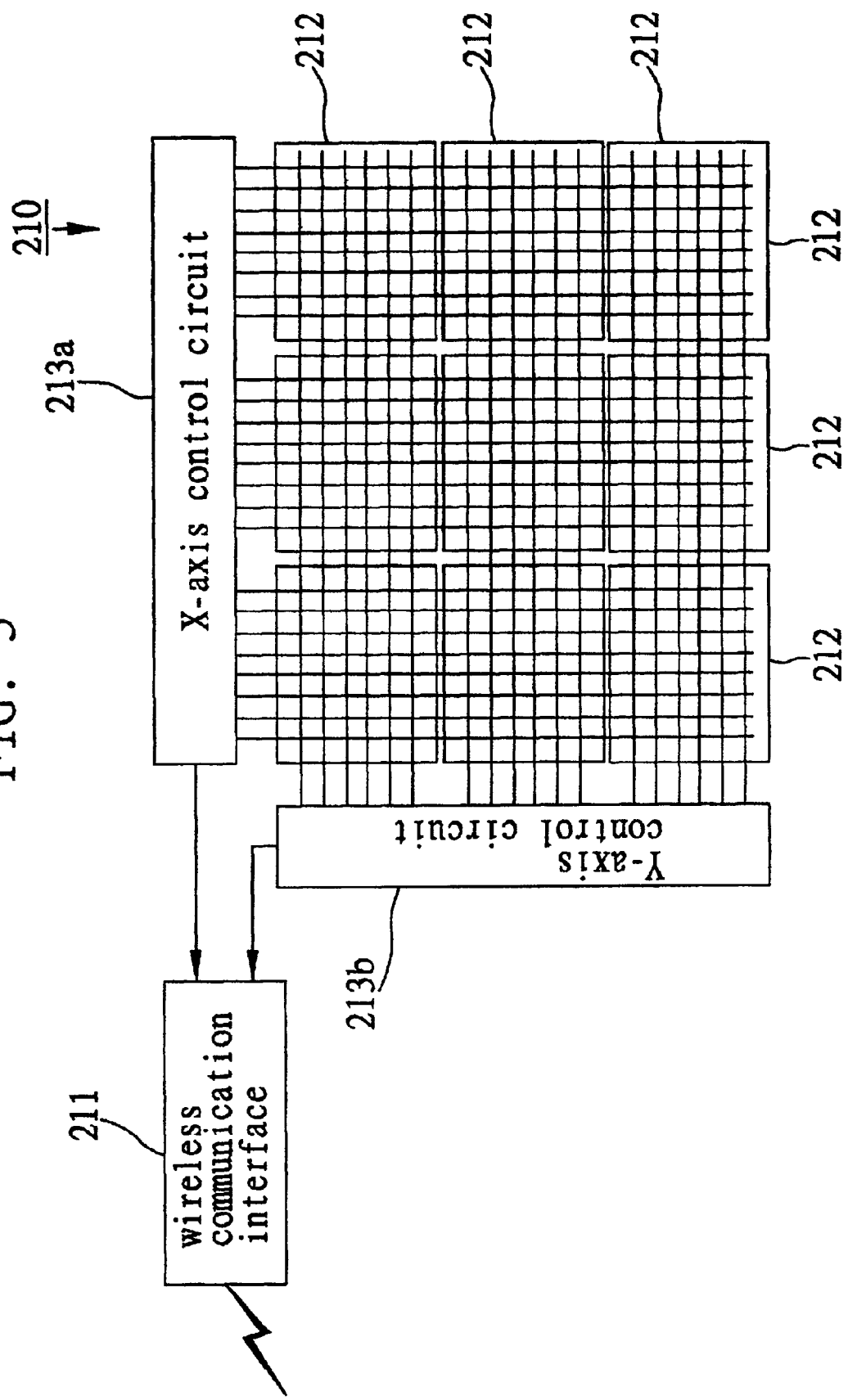
FIG. 3 is a schematic diagram showing internal circuitry of a digital board used in the invention.

The following description is made with reference to FIGS. 2 to 4 for depicting preferred embodiments of a digital display system of the present invention.

First referring to FIG. 2, the digital display system 200 of the invention is basically configured at least including: (a) a digital board 210; (b) a touch pen 220; and (c) a computer platform 230. The digital board 210 is provided with a large-scale panel and a wireless communication interface 211 of particular wireless communication protocol, such as standard IrDA (infrared data association) wireless communication interface. The computer platform 230 is also provided with a wireless communication interface 231 of the same wireless communication protocol. The wireless communication interfaces 211, 231 are correlated with frequency correspondence to each other, allowing data to be transmitted in a fixed-frequency manner between the wireless communication interfaces 211, 231. Moreover, the digital display system 200 of the invention can also operationally cooperate with a projector 240 selectively.

As shown in FIG. 3, internal systematic configuration of the digital board 210 includes: (a1) a plurality of currently-available printed circuit boards 212; and (a2) a X-coordinate axis control circuit 213a and a Y-coordinate axis control circuit 231b. These printed circuit boards 212 are commercially available with dimensions as those used in for example 4:3 or 16:9 digital boards, and can be assembled to integrally form a large-scale digital board with a desirably sized panel. For instance, nine 4:3-sized printed circuit boards 212 can be assembled as a whole to form a digital board 210 nine times larger in dimension than a regular 4:3 digital board.

Figure 4A:
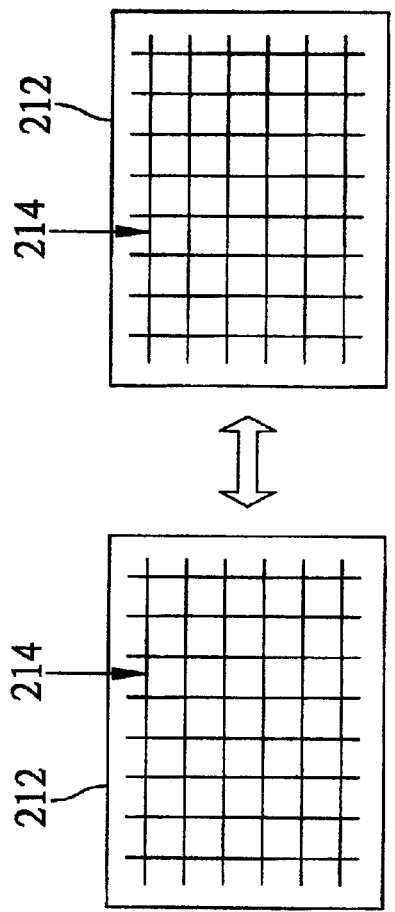
FIGS. 4A and 4B are schematic diagrams showing coupling between two printed circuit boards of a digital board used in the invention.
Figure 4B:
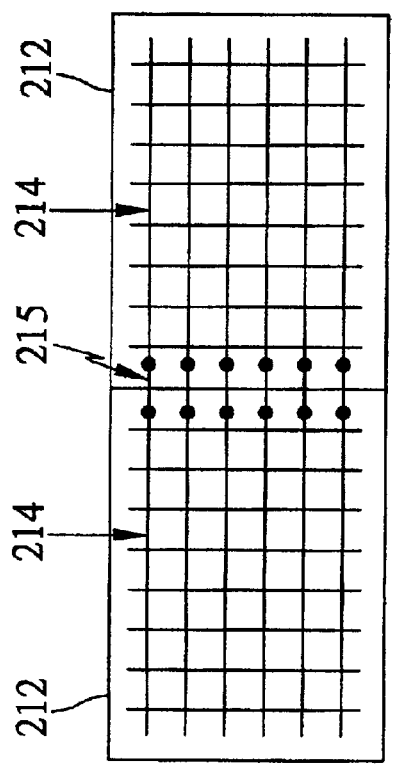

FIGS. 4A–4B illustrate coupling between two of the printed circuit boards 212. As shown in FIG. 4A, each of the printed circuit boards 212 is printed with a grid array of touch-control traces 214. Number and density of these touch-control traces 214 define resolution of the printed circuit board 212.

As shown in FIG. 4B, the invention is characterized in the forming of a plurality of conductive coupling wires 215 for coupling corresponding terminals of the touch-control traces 214 between two adjacent printed circuit boards 212, so as to electrically interconnect the two printed circuit boards 212. In the drawing, only lateral coupling of the printed circuit boards 212 is illustrated; it is understood that, vertical coupling can similarly proceed as the lateral coupling manner.

It is to be noted that, the conductive coupling wires 215 are preferably identical in conductivity coefficient to the touch-control traces 214. As the touch-control traces 214 are normally made of indium-tin oxide (ITO) commonly named conductive glass, it is thereby most preferable to adequately combine ITO with certain proportion of special material to form solid wires used as the conductive coupling wires 215.

By the above-described method, the invention can readily provide a digital board 210 with a large-scale panel, so as to allow a user to conveniently write on the panel by using the touch pen 220, whereby the touch-control traces 214 are urged to generate corresponding pixel coordinate signals, and transfer the generated signals through the wireless communication interfaces 211, 231 to the computer platform 230.

The touch pen 220 is an inductance type of touch-control device, for allowing the user to write on the digital board 210 through the use of the touch pen 220, by which the digital board 210 is urged to generate corresponding pixel coordinate signals. Since internal circuitry of the touch pen 220 is made by conventional technology, no further description thereof is to be detailed herein.

The computer platform 230 can be connected to the digital board 210 in a wired or wireless communication manner, preferably wireless communication. The computer platform 230 is used to receive the pixel coordinate signals generated from the digital board 210, and convert the received signals into graphic files or directly print out words or drawings provided on the digital board 210 by the user through the use of a printer (not shown).

The projector 240 can project the display on a screen of the computer platform 230 onto the large-scale panel of the digital board 210, by which the touch pen 220 can serve as a pointing device for allowing the user to select various window operation functions displayed on the digital board 210 and thereby to manipulate displayed application programs.

In practical operation, when the user uses the touch pen 220 to manually write or draw on the large-scale panel of the digital board 210, the touch-control traces 214 on the digital board 210 are activated, and in turn prompt the X-coordinate axis control circuit 213a and Y-coordinate axis control circuit 231b to generate corresponding pixel coordinate signals. By the wireless communication interfaces 211, 231, the generated pixel coordinate signals can be wirelessly transferred to the computer platform 230 where the transferred signals are converted into graphic files, or writing or drawings of the user can be directly printed out through the use of a printer (not shown).

In addition, besides the above wireless communication interface 211, the digital board 210 is further provided with a sound recognizing module 250 that can be externally connected to a sound collector 260 such as a microphone device. This allows the user in operation of the digital board 210, to produce phonetic signals and transmit the phonetic signals to the computer platform 230 through the wireless communication interface 211 so as to manipulate wireless phonetically-controlled operations of the computer platform 230, for example, switching a display page projected on the digital board 210 to a next page, etc.

In conclusion, the invention provides a novel digital display system characterized in that, a digital board for use in the digital display system is composed of a plurality of currently-available printed circuit boards, wherein each pair of the printed circuit boards are electrically interconnected by a plurality of conductive coupling wires in a manner as to form a large-sized panel for the digital board. This characteristic feature allows the digital board with the large-scale panel to be simply fabricated through the use of a currently-used jig, and the digital board can be flexibly enlarged in dimension according to practical requirements without needing a newly-designed jig for manufacturing a desirably-sized digital board, thereby making overall fabrication processes cost-effective to implement. Moreover, the digital display system of the invention can be connected to a computer platform through a wireless communication interface, by which pixel coordinate signals generated from the digital board are transferred to the computer platform. Therefore, in comparison with the prior art, the digital display system of the invention is more convenient to use with better improvement and practicability.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A digital display system, comprising:

a digital board composed of a plurality of printed circuit boards arranged collectively to function as a single panel, wherein each of the printed circuit boards is printed with a grid array of touch-control traces, and a plurality of conductive coupling wires are formed to electrically interconnect terminals of the touch-control traces between adjacent printed circuit boards;

a touch pen for allowing a user to use the touch pen to write on the digital board, whereby the digital board is urged to generate corresponding pixel coordinate signals; and a computer platform connected to the digital board through a communication interface of certain communication protocol, so as to receive the pixel coordinate signals generated from the digital board, and to convert the received signals into corresponding graphic files or print out writing provided on the digital board by the user wherein the electrical interconnections and the conductive coupling wires are configured: (1) to allow the plurality of printed circuit boards to be fabricated into a large-sized panel through the use of a currently-used jig, and (2) to allow the digital board to be flexibly enlarged in dimension without use of a newly-designed jig.

2. The digitial display system of claim 1, wherein the communication protocol is wired RS-232 communication protocol.

3. The digital display system of claim 1, wherein the communication protocol is wired IrDA (Infrared data association) communication protocol.

4. The digital display system of claim 1, wherein the conductive coupling wires are made of indium-tin oxide.

5. The digital display system of claim 1, wherein the digital board is further provided with a sound recognizing module that is externally connected to a sound collector, which is capable of receiving phonetic signals generated from the user in operation of the digital board, and transmitting the phonetic signals from the digital board to the computer platform through the communication interface, so as to manipulate phonetically-controlled operations of the computer platform.

6. A digital display system comprising:

a digital board composed of a plurality of printed circuit boards arranged collectively to function as a single panel, wherein each of the printed circuit boards is printed with a grid array of touch-control traces, and a plurality of conductive coupling wires are formed to electrically interconnect terminals of the touch-control traces between adjacent printed circuit boards;

a touch pen for allowing a user to use the touch pen to write on the digital board, whereby the digital board is urged to generate corresponding pixel coordinate signals; and a computer platform connected to the digital board through a wireless communication interface of certain communication protocol, so as to wirelessly receive the pixel coordinate signals generated from the digital board, and to convert the received signals into corresponding graphic files or print out writing provided on the digital board by the user wherein the electrical interconnections and the conductive coupling wires are configured: (1) to allow the plurality of printed circuit boards to be fabricated into a large-sized panel through the use of a currently-used jig, and (2) to allow the digital board to be flexibly enlarged in dimension without use of a newly-designed jig.

7. The digital display system of claim 6, wherein the communication protocol is wired IrDA (infrared data association) communication protocol.

8. The digital display system of claim 6, wherein the conductive coupling wires are made of indium-tin oxide.

9. A digital display system, comprising:

a plurality of printed circuit boards arranged collectivly to function as a single panel, each of which is printed with a grid array of touch-control traces; and a plurality of conductive coupling wires for electrically interconnecting terminals of the touch-control traces between adjacent printed circuit boards;

wherein the electrical interconnections and the conductive coupling wires are configured: (1) to allow plurality of printed circuit boards to be fabricated into a large-sized panel through the use of a currently-used jig, and (2) to allow the digital board to be flexibly enlarged in dimension without use of a newly-designed jig.

10. The digital display system of claim 9, wherein the conductive coupling wires are made of indium-tin oxide.

* * * * *